Aug. 14, 1951
E. H. PITNEY
2,564,230
LIQUID LEVEL MAINTAINER
Filed March 5, 1948
2 Sheets-Sheet 1
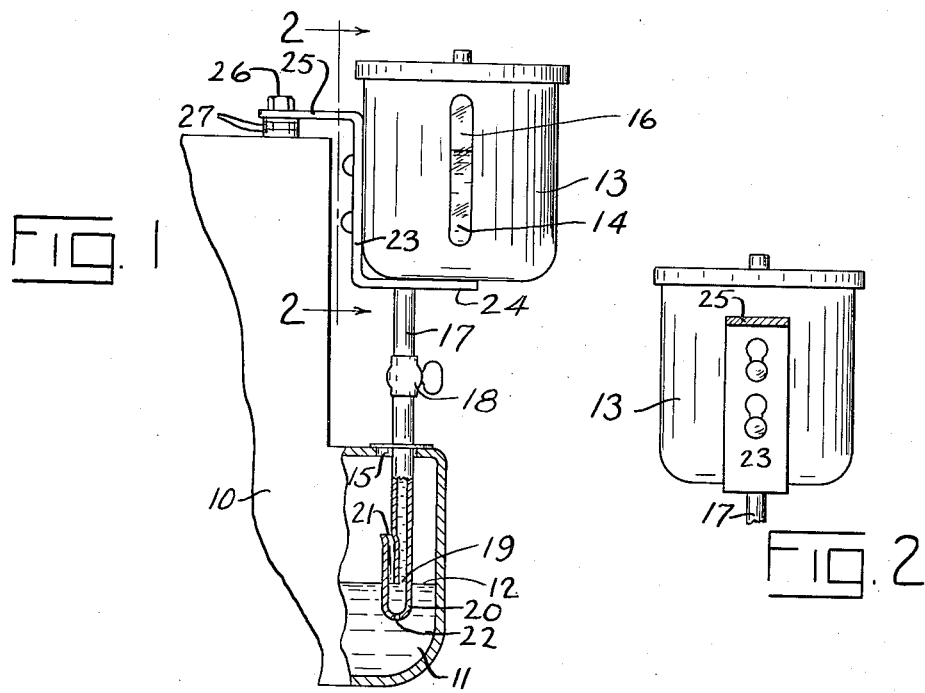
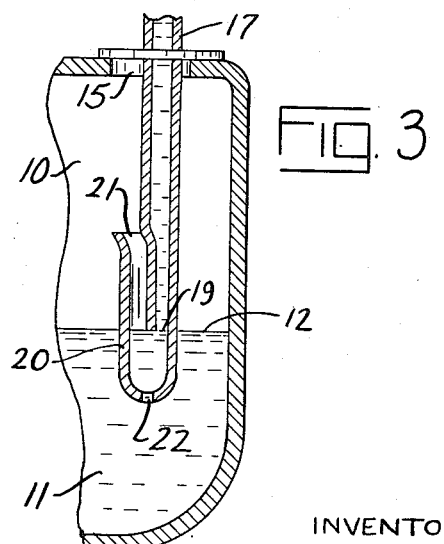
INVENTOR
EARL H. PITNEY
BY
G. H. Braddock
ATTORNEY Aug. 14, 1951     E. H. PITNEY     2,564,230
LIQUID LEVEL MAINTAINER
Filed March 5, 1948     2 Sheets-Sheet 2
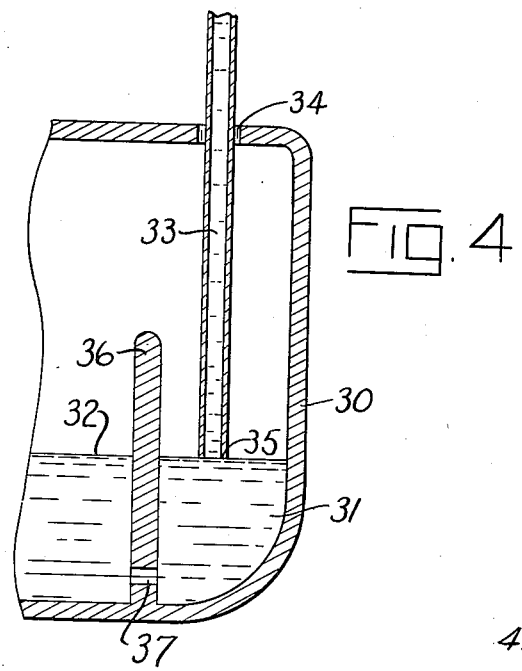
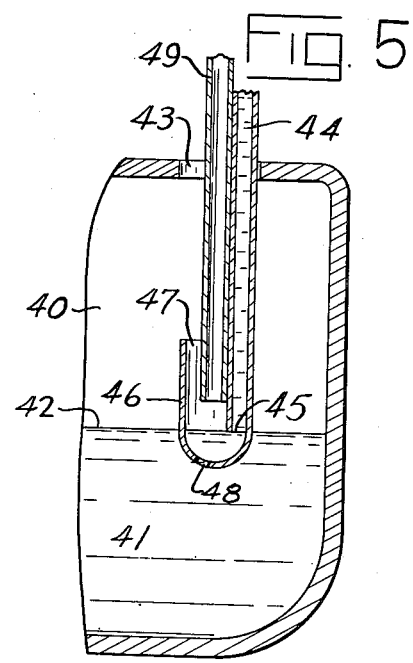
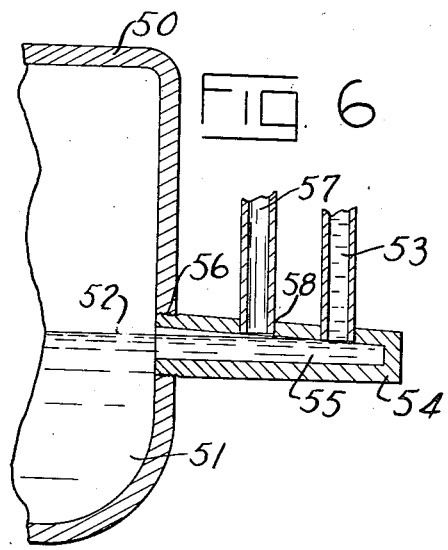
INVENTOR
EARL H. PITNEY
BY
*G. H. Braddock*
ATTORNEY Patented Aug. 14, 1951

2,564,230

UNITED STATES PATENT OFFICE 2,564,230

LIQUID LEVEL MAINTAINER

Earl H. Pitney, Minneapolis, Minn.

Application March 5, 1948, Serial No. 13,207

1 Claim. (Cl. 137—68)

This invention has relation to a device for employment in connection with a liquid circulating system to maintain the level of liquid to be circulated substantially constant, thus to constantly maintain in the system a substantially fixed quantity of the liquid.

An object of the invention is to provide a liquid level maintainer which will be of simple, inexpensive, practical, satisfactory, efficient, novel and improved construction.

A further object is to provide a device for controlling the level of liquid in a liquid circulating system which will be operative in a new and improved manner to maintain said level substantially constant.

And a further object is to provide a liquid level maintainer of the character as stated wherein will be incorporated desirable and improved features and characteristics of construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

While the principles of the present invention are applicable to many different uses, as for example, to maintain the level of lubricating oil in the crankcase of an engine of any type substantially constant, the new and improved liquid level maintainer is herein illustrated and described as when applied to an ordinary automotive vehicle internal combustion engine to maintain the level of lubricating oil in its crankcase at a predetermined, substantially constant level.

In the accompanying drawings forming a part of this specification,

Fig. 1 is a side elevational view, partially in section and partially broken away, of a liquid level maintainer made according to the invention as when applied to use;

Fig. 2 is a vertical sectional view of the liquid level maintainer, taken on line 2—2 in Fig. 1;

Fig. 3 is an enlarged fragmentary sectional view detailing features of a lower portion of the liquid level maintainer disclosed in Fig. 1;

Fig. 4 is a fragmentary sectional view corresponding generally with the disclosure of Fig. 3, showing a liquid level maintainer of modified construction incorporating features and characteristics of the invention;

Fig. 5 is a fragmentary sectional view, corresponding generally with the disclosures of Figs. 3 and 4, showing a liquid level maintainer of further modified construction made according to the invention; and Fig. 6 is a fragmentary sectional view, corresponding generally with the disclosures of Figs. 3, 4 and 5, showing a liquid level maintainer of still further modified construction incorporating features and characteristics of the invention.

With respect to Figs. 1 to 3 and the numerals of reference thereon, 10 denotes the crankcase of an internal combustion engine of an automotive vehicle, and 11 indicates lubricating oil in said crankcase filling said crankcase up to a level, represented 12, which is a predetermined level for the lubricating oil in the disclosure as made.

The crankcase oil 11 will be circulated in a well known manner by a pressure lubricating system (not shown) of the internal combustion engine, and a crank shaft (not necessary to be shown) within the crankcase 10 will be rotatable in said oil 11 in customary fashion.

A vessel 13 providing an airtight container for reserve lubricating oil 14 is suitably and conveniently supported at elevation above the usual dip stick opening 15, and a sight opening in the vessel 13 is represented 16.

A vertical feed pipe 17 has its upper end contiguously connected to the bottom of the vessel 13, and a lower end portion of said vertical feed pipe passes downwardly through said dip stick opening 15 and is situated within the crankcase 10. A manually operable valve 18, for controlling flow through the vertical feed pipe 17, is situated along a portion of the length of said vertical feed pipe below the vessel 13 and above the dip stick opening 15.

The lower open end 19 of the vertical feed pipe 17 terminates substantially at the level 12 of lubricating oil 11 in the crankcase 10, and said lower end of said vertical feed pipe merges and opens into a vertical cup 20 the lower portion of which is situated within the lubricating oil 11 and the upper portion of which is open, as at 21, to atmosphere within the crankcase, at elevation above the predetermined level 12 of lubricating oil in said crankcase. The lower end of the vertical cup 20 is situated well below said predetermined level 12 of lubricating oil, and a bleeder orifice in said lower end of said vertical cup, contiguous at its inner end with the interior of the vertical cup and at its outer end with the interior of the crankcase, is denoted 22.

The construction and arrangement will be such that lubricating oil 11 constantly will be splashed into the vertical cup 20, in response to rotative movement of the crank shaft within the crankcase 10 and by way of the open upper portion 21 of said vertical cup, whenever the internal combustion engine having said crank shaft is in operation, and also such that lubricating oil splashed into the vertical cup will constitute a liquid seal precluding downward flow of lubricating oil 14 from the reserve supply in the vessel 13 into the crankcase by way of the vertical feed pipe 17 and the vertical cup 20.

The vessel 13 can be supported in any suitable and convenient manner. In the disclosure as made, said vessel 13 is rigid with a vertical arm 23 of a Z-shape bracket including a horizontal lower arm 24 disposed beneath the vessel and a horizontal upper arm 25 secured to an upper surface of the crankcase 10 by a screw bolt 26. Washers 27, upon said screw bolt and between the horizontal upper arm 25 and the crankcase, can be employed to accomplish vertical adjustment of the vessel 13 and the vertical feed pipe 17, thus to accomplish vertical adjustment of the lower open end 19 of said vertical feed pipe.

The lubricating oil 11 is disclosed in Figs. 1 and 3 at its level as when an internal combustion engine with which the liquid level maintainer is assembled is inoperative. Stated otherwise, the manually operable control valve 18 is open, natural static conditions prevail, and the level of lubricating oil 11 is substantially at the elevation of the lower end of the vertical feed pipe 17. The crank shaft of said internal combustion engine will commence to rotate immediately upon starting up to cause sealing liquid to be splashed into the vertical cup 20 simultaneously with commencement of rotation of said crank shaft and a liquid seal to be continuously existent in said vertical cup during the whole of any interval of operation of the internal combustion engine. The liquid seal will prevent flow of lubricating oil 14 from the vertical feed pipe 17 into the crankcase, by way of the bleeder orifice 22, while said internal combustion engine is in operation even though the level of lubricating oil 11 in said crankcase falls to a level below the elevation of the lower open end 19 of the vertical feed pipe 17. Upon cessation of operation of the internal combustion engine, however, there will be equalizing flow of lubricating oil, by way of the bleeder orifice 22, causing the lubricating oil in the crankcase 10 and the lower portion of the vertical cup 20 to reach a common level, and said common level will be substantially at the elevation of said lower open end 19 of said vertical feed pipe 17. In any instance when an operation of the internal combustion causes no appreciable amount of oil to be consumed, lubricating oil 11 will itself be sufficient to raise the lubricating oil level to the elevation of the lower open end of the vertical pipe 17. In any instance when an operation of said internal combustion engine causes an appreciable amount of oil to be consumed, lubricating oil 14 will flow by gravity from the vessel 13 into the vertical cup 20 until there is equalization of flow between the crankcase and said vertical cup up to a level substantially at the elevation of said lower open end of said vertical pipe. It will be apparent that the elevation at which the lower open end 19 of the vertical feed pipe 17 is set predetermines the level of lubricating oil in the crankcase 10 when static conditions prevail and that the elevation at which said lower open end 19 is set can be adjusted merely by vertically adjusting the vessel 13.

Desirably, the construction and arrangement can be such that flow of lubricating oil between the crankcase 10 and the vertical cup 20 becomes equalized, upon cessation of operation of the internal combustion engine, substantially at the time the whole of the body of lubricating oil 11 in said crankcase reaches its static condition.

Referring to Fig. 4, 30 denotes a crankcase, 31 indicates lubricating oil in said crankcase, and 32 represents a predetermined level of said lubricating oil 31.

The crankcase oil 31 will be circulated by a pressure lubricating system, and a crank shaft will be situated within the crankcase 30.

A vertical feed pipe 33, equivalent to the vertical feed pipe 17, has its lower end portion arranged in a dip stick opening 34, equivalent to the dip stick opening 15, and situated within the crank case 30.

The lower open end 35 of the vertical feed pipe 33 terminates substantially at the level 32 of lubricating oil 31 in the crankcase 30, and a vertical cup 36 surrounding the lower end portion of said vertical pipe is constituted as a partition across the crankcase and a lower part of an end of said crankcase. The lower end of said vertical cup 36 is also a lower portion of the crankcase and the upper portion of said cup is open, at the location of said partition, at elevation above the predetermined level 32 of lubricating oil. A bleeder orifice through a lower portion of the partition, below the lubricating oil level 32, is designated 37.

The liquid level maintainer as illustrated in Fig. 4 and as herein described will function in the same general manner as set forth in connection with the disclosure of Figs. 1 to 3.

In Fig. 5, 40 denotes a crankcase, 41 represents lubricating oil in said crankcase up to a predetermined level 42, 43 is a dip stick opening, 44 is a vertical feed pipe, 45 is the lower end of said vertical feed pipe, 46 is a vertical cup with open upper portion 47, and 48 indicates a bleeder orifice, all equivalent to similar elements described in connection with Figs. 1 to 3 and adapted to function in the same general manner.

Additionally, Fig. 5 discloses a return flow connection 49, from the pressure lubricating system of an internal combustion engine with which the liquid level maintainer of said Fig. 5 is associated, having its lower end portion contiguous with the open upper portion 47 of said vertical cup 46. Said return flow connection 49 can lead from an oil purifier.

Immediately upon commencement of operation of said internal combustion engine liquid will enter the vertical cup 46 by way of the return flow connection 49 thus to assist in providing the liquid seal.

With respect to Fig. 6, 50 denotes a crankcase with lubricating oil 51 up to a predetermined level 52. The crankcase oil 51 will be circulated by a pressure lubricating system of an internal combustion engine or otherwise.

The lower open end of a vertical feed pipe 53, equivalent to the vertical feed pipe 17, enters an upper wall of a horizontal cup 54 and is contiguous with a chamber 55 of said horizontal cup. The inner end of the horizontal cup 54 is fixed, as at 56, in a side wall of the crankcase 50 at the elevation of the predetermined level 52 of lubricating oil in such manner that the chamber 55 and the interior of said crankcase are contiguous. The upper part of the inner end portion of the chamber 55 is above the predetermined level 52, the lower part of the inner end portion of said chamber is well below said predetermined level, the upper wall of the horizontal cup 54 providing the chamber slants downwardly and outwardly and the lower wall of said horizontal cup is horizontally disposed.

A return flow connection 57, from the pressure lubricating system of an internal combustion engine with which the liquid level maintainer of Fig. 6 is associated, includes a lower end portion which enters, as at 58, the upper wall of the horizontal cup 54 at a location between the vertical feed pipe 53 and the crankcase 50 and is contiguous with the chamber 55. Said return flow connection 57 can be by way of an oil purifier.

Lubricating oil constantly will be fed from the return flow connection 57 into the chamber 55 in response to operation of said internal combustion engine, and the construction and arrangement will be such that lubricating oil fed into said chamber 55 from said return flow connection 57 will constitute a liquid seal precluding downward flow of lubricating oil through the vertical feed pipe 53.

The lubricating oil 51 is disclosed in Fig. 6 at its level as when an internal combustion engine with which the liquid level maintainer is assembled is inoperative. That is, natural static conditions prevail, and the level of lubricating oil 51 is substantially at the elevation of the lower end of the vertical feed pipe 53. The pressure lubricating system of said internal combustion engine will cause lubricating oil to be fed to the chamber 55 immediately upon starting up and a liquid seal continuously will be existent in the horizontal cup during the whole of any interval of operation of the internal combustion engine. The liquid seal will prevent flow of lubricating oil from the vertical feed pipe 53 into the chamber 55 while said internal combustion engine is operative even though the level of lubricating oil 51 in the crankcase 50 falls to a level below the elevation of the lower open end of the vertical feed pipe 53. Upon cessation of operation of the internal combustion engine there will be equalizing flow of lubricating oil until lubricating oil in the crankcase and the horizontal cup reaches a common level, and said common level will be substantially at the elevation of the lower open end of the vertical feed pipe 53. Should no appreciable amount of lubricating oil be consumed during an interval of engine operation, lubricating oil 51 will itself be sufficient to raise the lubricating oil level to the elevation of the lower open end of said vertical feed pipe 53. Should, however, an appreciable amount of lubricating oil be consumed during an interval of engine operation, lubricating oil will flow by gravity from the vertical feed pipe 53 into the chamber 55 until there is lubricating oil in the crankcase and said chamber up to a level substantially at the elevation of said lower open end of said vertical feed pipe 53. The elevation at which the lower open end of the vertical feed pipe 53 is set of course will predetermine the level of lubricating oil in the crankcase 50 when static conditions prevail.

What is claimed is:

The combination with a liquid circulating system including a container for liquid, means for removing liquid from said container and means for returning liquid to said container, of a device for maintaining the level of liquid in said container at a predetermined, substantially constant level, constituted as a hollow member providing a sealing chamber contiguous with and open to the interior of said container at elevation above and below said predetermined level, an air tight vessel for reserve liquid, a pipe connection leading by gravity from said vessel and opening to said chamber substantially at the elevation at which the level of liquid in said container is to be maintained, a conduit leading from said return means and open to said sealing chamber and means to maintain the level of liquid in the sealing chamber at a level above that at which said pipe connection opens to said sealing chamber whenever liquid is flowing from said conduit into said sealing chamber.

EARL H. PITNEY.

REFERENCES CITED

The following references are of record in the file of this patent:

UNITED STATES PATENTS

| Number | Name | Date |
|---|---|---|
| 1,230,658 | Brace | June 19, 1917 |
| 1,465,167 | Miller | Aug. 14, 1923 |
| 1,922,383 | Madden | Aug. 15, 1933 |
| 2,081,315 | Weber | May 25, 1937 |